Nov. 30, 1971 L. A. MORTENSEN 3,623,396
EXPANSION PLUG
Original Filed April 4, 1968 2 Sheets-Sheet 1
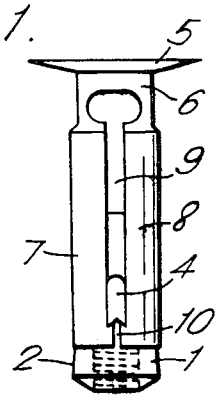
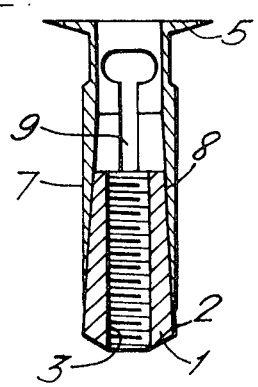
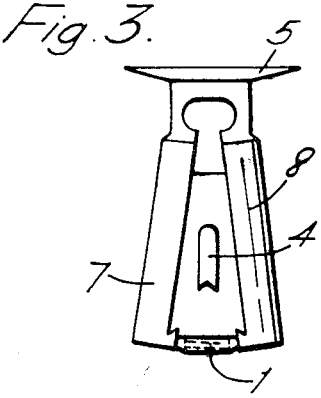
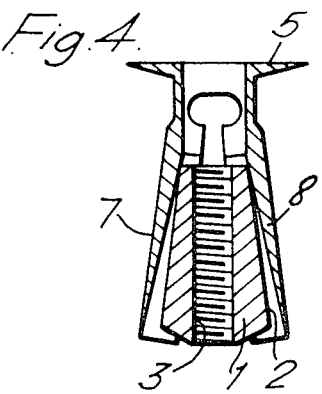
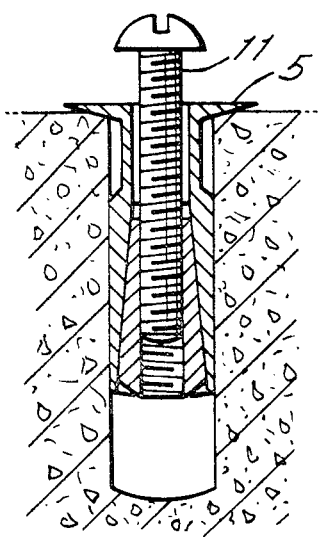
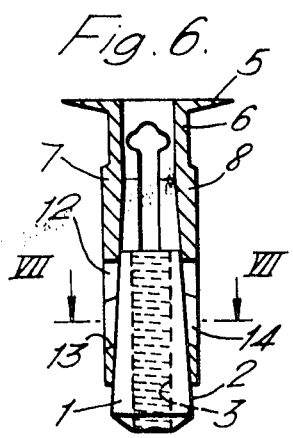
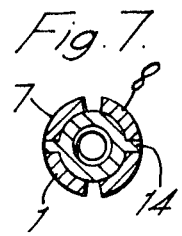
INVENTOR
LOUIS AACKERSBERG MORTENSEN
BY
Nolte & Nolte
ATTORNEYS

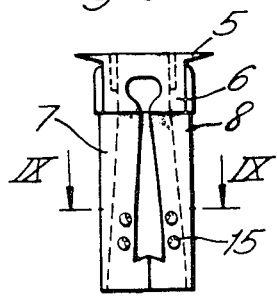
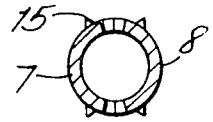
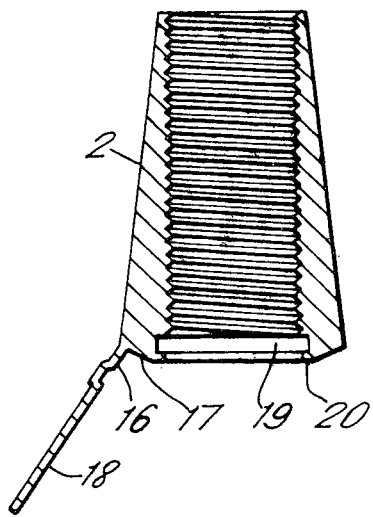
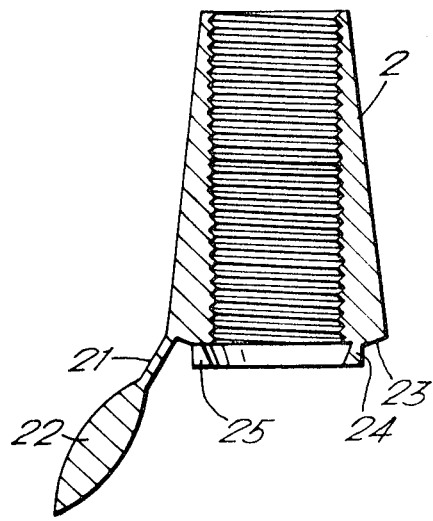
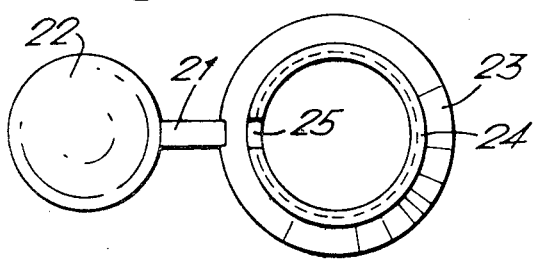

United States Patent Office 3,623,396
Patented Nov. 30, 1971

3,623,396
EXPANSION PLUG
Louis Aackersberg Mortensen, Kongevejen 35
Birkerod, Denmark
Continuation of application Ser. No. 718,708, Apr. 4,
1968. This application Nov. 24, 1969, Ser. No. 872,462
Claims priority, application Denmark, Apr. 5, 1967,
1,943/67
Int. Cl. F16b 13/06
U.S. Cl. 85—75                                7 Claims

ABSTRACT OF THE DISCLOSURE

An expansion plug is provided which has an inner part and an outer part, these parts being axially displaceable with respect to each other, and means are provided on these parts for preventing the complete separation thereof and for maintaining the radial displacement of the outer part when the outer and inner parts are in a predetermined axial relationship.

This is a continuation of application No. 718,708, filed Apr. 4, 1968, and now abandoned.

The invention relates to an expansion plug of the type having an inner part having a conical outer surface, and an outer part having a conical inner surface, said two parts being adapted in such a manner that they can be tightened axially in relation to each other by means of a screw so that the outer surface of the outer part is pressed outwards, the outer part being made with an annular or tubular end portion and outwards flexible sectors extending axially from said sectors.

The object of the invention is to devise an expansion plug of the type indicated by means of which there may be obtained a cheap manufacture and a good retainment in a bored hole even if said hole has a slightly larger diameter than the diameter for which the expansion plug in fact was intended for, said expansion plug being fully servicable even if it has been subject to expansion before being used, said plug therefore being suitable for use several times. Furthermore, it is an object of the invention to devise an expansion plug of the type indicated where there is no risk of the inner part becoming lost. The characteristic features of the expansion plug according to the invention are that the sectors are connected with the annular or tubular end portion by means of elastically resilient connection portions that are adapted to, in unstrained condition, maintain the sectors in a substantially axial position, and that the sectors and the inner part have mutually cooperating members to prevent movement of the inner part out of the outer part at the end opposite the annular or tubular end portion. By these means it is obtained that the sectors resiliently will move back to a start position after an expansion, and even after being subjected to hard treatment the sectors therefore will be in the correct position for use, and the expansion plug may be used several times.

There is known expansion plugs which in the manufactured condition have projections to prevent movement of the inner part out of the outer part, but the effect of these members are neutralized when the outer part is expanded. In the expansion plug according to the invention they will to the contrary always be in their effective position when they are needed, as after the expansion has been relieved the sectors will resiliently move back to the start position.

The sectors themselves may also, according to the invention, be elastically resilient as they consist of a stiff resilient material. Such a material will be substantially non-plastic, so that the expansion plug after the lapse of a period of time cannot be tightened further, and therefore there is obtained a dependable retainment.

The sector's and the inner part's mutually cooperating members to prevent movement of the inner part out of the outer part may, according to the invention, be undercut in such a manner that displacement of the two parts in the direction opposite the tightening direction causes the sectors to be pulled inwards towards the inner part. Hereby the insertion of the expansion plug in a bored hole is facilitated.

The expansion plug may, according to the invention, be made in such a manner that the inner part at each of the slits between the sectors has a locking projection projecting out into the slit and having a V-shaped recess on the end surface facing axially away from the annular or tubular end portion, and that the slits between the sectors of the outer part are made with undercut edge portions each being adapted to engage one half of the V-shaped hollow. Hereby it is obtained that during insertion in a bored hole the sectors will be pulled together around the inner part so that the insertion takes place easily.

According to the invention the cone apex angle of the inner and outer part may have such a size, for instance 12°, in relation to the coefficient of friction between the two conical surfaces that there is obtained self-locking when the two parts are tightened in relation to each other. Hereby it is obtained that the expansion plug may be clamped fast in a hole whereafter the screw may be screwed out without the retainment of the plug being released. This entails considerable advantages during mounting of objects, particularly heavy objects. Said self-locking is furthermore advantageous when the sectors are so easily deflectable that sufficient axial tension may be exerted manually to expand the plug and cause it to be clamped fast in the hole. When an intense tension thereafter is applied to the inner part, the plug will be clamped even tighter in the hole, and thus it is not necessary to carry out a tight screwing to obtain sufficient retainment in the hole.

The annular or tubular end portion of the expansion plug may have one or more projecting abutment members to prevent the expansion plug from being pressed so far into a bored hole in a wall that the outer end lies inside the hole.

In an expansion plug where one or more sectors of the outer part on their outer surface have outwards projecting projections, the sectors may, according to the invention, only have projections at a level with the region of the inner part in the latter's start position.

Hereby it is obtained that during the insertion of the expansion plug the sectors will not be bent into such a position that the tightening of the two parts in relation to each other is rendered difficult.

The projections may, according to the invention, be made in the form of spikes. If the hole into which the plug is inserted is relatively small the tops of the spikes will be worn off. The spikes may therefore without any deleterious effects be made with a rather large height so that they can engage the wall of the hole even if the latter is rather large.

The expansion plug may, according to the invention, have two or more pairs of projections where the projections of each pair are arranged on the same generatrix of the outer surface of the sector. Hereby there is obtained a particularly good effect of the projections.

The projections may, according to the invention, be arranged near the slits between the sectors. Hereby it is obtained that deformation of the projections may take place in the direction out towards the slits.

In the drawings there is shown some embodiments of an expansion plug according to the invention, FIG. 1 showing a lateral view of a first embodiment of an expansion plug in a start position, FIG. 2 a longitudinal section through same, FIG. 3 a lateral view of same in expanded free position, FIG. 4 a longitudinal section through same, FIG. 5 a longitudinal section through same in expanded position clamped fast in a bored hole by means of a screw, FIG. 6 a longitudinal section through a second embodiment of an expansion plug, FIG. 7 a section along line VII—VII in FIG. 6, FIG. 8 a lateral view of an outer part of third embodiment of an expansion plug in its start position, FIG. 9 a section along line IX—IX in FIG. 8 through same, FIG. 10 an inner part with a hinged closing flap, FIG. 11 a longitudinal section through an inner part with another embodiment of a hinged closing flap, FIG. 12 a section along line XII—XII in FIG. 11.

The expansion plug shown in FIGS. 1–5 consists of an inner part and an outer part. The inner part is designated by 1 and is made of plastic, for instance rather hard, preferably stiff elastic plastic, by means of injection molding. It has a conical outer surface 2, for instance with an apex angle of 12°, and an inner cylindrical screw thread 3 for a machine screw. On the conical outer surface the inner part has two projections 4, which in the direction towards the broad end of the part has a V-shaped end surface.

The outer part also consists of plastic and is made by injection molding. It has an end flange 5, which are designed so that removal of the expansion plug can be easily achieved, a short tubular end portion 6 and two sectors 7 and 8, each extending across nearly 180° of the periphery. In the end portion 6 there is, in connection with the slits between the two sectors, made a relatively large or broad hole whereby the sectors 7 and 8 are connected with the upper portion of the tubular end portion 6 by means of narrow easily flexible elastically resilient connection portions. The two sectors 7 and 8 have an inner conical surface corresponding to the outer surface of the inner part 1, while they have cylindrical outer surfaces. Their conical surface may advantageously have a larger axial extension than the inner portion 1. The outer part is preferably made from relatively hard stiff plastic that can bend elastically. The slits between the two sectors 7 and 8 are made with a stretch 9 with a width corresponding to the width of a projection 4 and a narrower end stretch 10. The transition between the stretches 9 and 10 consists of a sharp-edged part that is made in such a manner that the two sharp-edged parts are suited to engage the V-shaped end surface of the projection 4 beside each other.

When using the expansion plug there is employed a screw 11. In the non-expanded position shown in FIG. 1 the plug is inserted in a bored hole in a wall. The plug is used for fastening a not shown object. The screw 11 is inserted through a hole in the object and when it is tightened the inner part 1 will be displaced axially outwards in relation to the outer part. By means of cooperation between the conical surface on the inner part and the conical surfaces on the sectors 7 and 8 the latter will be pressed outwards and the latter's surfaces will fixedly abut the wall of the hole bored in the wall, so that there is obtained an effective frictional engagement to prevent the plug from being pulled out of the hole.

The cone apex angle is adjusted in such a manner in relation to the coefficient of friction between the inner and outer part that self-locking is obtained. If the screw is screwed out later the plug will therefore stay fixed in the hole. If so desired the plug may be released by screwing the screw slightly backwards from its tightening position and striking the screw's head. Thereby the inner part will be displaced inwards so that the expansion is relieved whereafter the plug may be pulled out of the hole.

When the plug is clamped fast in the hole the inner part 1 will be compressed whereby it clamps fast around the screw 11. It has turned out that thereby there is obtained an exceptionally great strength in the screw connection. Furthermore the screw is effectively protected against rust on the stretch in question so that even after the lapse of a very long time it will be easy to screw the screw loose. On account of the clamping around the screw it will be ensured that the latter cannot be shaken loose.

The expansion plug shown in FIGS. 6 and 7 corresponds substantially to the plug shown in FIGS. 1–5. At the middle of each sector 7 and 8 there is made a longitudinally extending slit 12 which at its lower end has an oblique end edge 13. Oblong projections 14 project out into the slits 12, said projections 14 have at the end in question an oblique end edge corresponding to the end edge 13. This construction serves just at the construction with the projections 4 in the embodiment shown in FIGS. 1–5 to ensure that the inner part does not become lost and that the two sections are maintained close together around the inner part.

The outer part shown in FIGS. 8 and 9 corresponds substantially to the outer part of the embodiment shown in FIGS. 1–5. The sectors 7 and 8, however, in this case have four pairs of projecting points 15 arranged on the same generatrix near the slits. When the expansion plug is inserted in a bored hole in a wall the points 15 will scrape against the wall of the hole. If the hole is tight the points will be worn somewhat off. When the tightening of the two parts in relation to each other starts the points will entail a start frictional resistance for the start of the expansion. This is particularly important when the plug is to be clamped fast in a position deep inside a hole.

In FIG. 10 there is shown a modified embodiment of the inner part of the expansion plug shown in FIGS. 1–5. During the molding the part has been made with a hinge band 16 extending from a conical end surface 17 at the corner between the latter and the conical outer surface 2, and with a closing cover 18 carried by the hinge band. The cover 18 may, by means of bending of the hinge band 16, be inserted into a suitable aperture 19 with a circumferential locking edge 20. When the closing cover is in place in the aperture 19 boring dust is prevented from penetrating from the hole into the screw thread 3 in the inner part. When the screw 11 is screwed through the inner part it will push the closing cover away, but as it is hinged to the inner part there is no risk of it being lost, for instance during manipulations before the insertion into the hole.

In FIGS. 11 and 12 there is shown a second modified embodiment of the inner part of the expansion plug shown in FIGS. 1–5. During the molding the part has been made with a hinge band 21 extending from the end of the conical outer surface 2 and with a closing cover 22 carried by the hinge band, said closing cover having lens-shaped cross section. The part has, outside the end of the conical outer surface 2, a plane recess 23 and an axially projecting cylindrical collor 24 in which there has been made a recess 25 for the hinge band. The inner side of the collar 24 is undercut. The cover 22 may, by bending the hinge band 21, be inserted into an aperture in the collar 24, as the hinge band hereby can enter the recess 25. The insertion of the cover 22 in the aperture takes place easily on account of its lens-like shape, for instance by being pressed against a plane surface such as a table-top. Hereby automatic closing of the cover can be carried out easily, said closing cover functioning in the same manner as the cover described in connection with FIG. 10.

The shown and described embodiments are only to be considered by way of example, as diffeernt variations are conceivable within the scope of the invention.

What is claimed is:

1. An expansion plug having an inner part having a conical outer surface, and an outer part having a conical inner surface, said two parts being adapted in such a manner that they can be tightened axially in relation to each other by means of a screw so that the outer surface of the outer part is displaced outwards, the outer part being made with an annular or tubular first end portion and sectors extending axially at the other end thereof, said sectors consisting of a stiff resilient material and having slits therebetween and decreasing in radial dimension in the direction away from the first end portion, said conical surface being formed on said sectors, said inner part at each of the slits between the sectors having a locking projection projecting out into the slit and having a V-shaped recess on the end surface facing axially away from the annular or tubular end portion, and said slits between the sectors of the outer part being formed with undercut edge portions, each being adapted to engage one half of the V-shaped recess, and intermediate members connecting said annular or tubular end portion and said sectors and each having a minimum dimension taken on a circumference about the axis of the plug substantially less than the dimension taken on a circumference about the axis of the plug of the respective sector to which the intermediate member is connected at the juncture of the intermediate member and the sector and having a minimum radial dimension less than the maximum radial dimension of the sector to which it is connected, said intermediate members being resilient and biasing said sectors radially toward the axis of said plug, thereby constituting means for returning said sectors into said cooperating relationship after said relationship has been terminated by the displacement of said expansion plug outwardly.

2. An expansion plug according to claim 1, wherein the annular or tubular end portion has one or more projecting abutment members for preventing the expansion plug from being pressed so far into a bored hole in a wall that the outer end lies inside the hole.

3. An expansion plug according to claim 2, wherein said projecting abutment members are adapted to be non-flush with the wall and thereby constitute means for removing said plug from said wall.

4. An expansion plug according to claim 1, wherein at least one sector of the outer part has outwardly projecting projections, said sectors having projections at a level with the region of the inner part in the latter's start position only.

5. An expansion plug according to claim 4, wherein said projections are made in the form of spikes.

6. An expansion plug according to claim 4, including two or more pairs of said projections where the projections of each pair are arranged on the same generatix of the outer surface of the sector.

7. An expansion plug according to claim 4, wherein said projections are arranged near the slits between the sectors.

References Cited

UNITED STATES PATENTS

| | | | |
|---|---|---|---|
| 674,074 | 5/1901 | Bennett | 85—75 |
| 966,515 | 8/1910 | Baker | 85—76 |
| 1,109,955 | 9/1914 | Barrett | 85—76 |
| 1,434,394 | 11/1922 | Matthes | 85—75 |
| 1,470,423 | 10/1923 | Brady | 85—75 |
| 2,159,580 | 5/1939 | Zifferer | 85—75 |
| 2,319,376 | 5/1943 | Wallace | 85—75 |

FOREIGN PATENTS

| | | | |
|---|---|---|---|
| 1,339,663 | 9/1963 | France | 85—73 |
| 575,724 | 3/1946 | Great Britain | 85—75 |
| 873,980 | 8/1961 | Great Britain | 85—73 |

EDWARD C. ALLEN, Primary Examiner